(No Model.) 2 Sheets—Sheet 1.
O. OHLSSON.
CENTRIFUGAL CREAMER.

No. 536,579. Patented Mar. 26, 1895.

Witnesses:
Nicholas M. Goodlett Jr.
H. L. Prince

Inventor:
Olof Ohlsson
by his attorneys
Witter & Kenyon

THE NORRIS PETERS CO., PHOTO-LITHO., WASHINGTON, D. C.

(No Model.) 2 Sheets—Sheet 2.

O. OHLSSON.
CENTRIFUGAL CREAMER.

No. 536,579. Patented Mar. 26, 1895.

Witnesses:
Nicholas M. Goodlett Jr.
H. L. Prince

Inventor:
Olof Ohlsson
by his attorneys
Witter & Kenyon

UNITED STATES PATENT OFFICE.

OLOF OHLSSON, OF NEWARK, NEW JERSEY.

CENTRIFUGAL CREAMER.

SPECIFICATION forming part of Letters Patent No. 536,579, dated March 26, 1895.

Application filed March 4, 1895. Serial No. 540,505. (No model.)

*To all whom it may concern:*

Be it known that I, OLOF OHLSSON, a citizen of the United States, residing at Newark, in the county of Essex, State of New Jersey, have invented a new and useful Improvement in Centrifugal Creamers, of which the following is a full, clear, and exact description.

The present invention is in the nature of a specific improvement in the line of the invention shown and claimed in my application for centrifugal creamers, Serial No. 540,504, filed of even date herewith—that is to say, I dispense with the use of numerous parallel partitions dividing the interior liquid space of the bowl and the milk that is being separated in it into numerous thin bodies, layers or strata, and instead I employ a single encircling frame of guiding plates placed in the outer portion of the liquid space and so arranged with respect to each other and to the lines of centrifugal force as to produce colliding currents of half separated cream particles, and to force the same through openings toward the center whereby coalescence of the cream particles is attained and the ultimate separation of the cream from the blue milk greatly furthered.

The object of the present invention is to provide a centrifugal creamer that will have a high percentage or grade of efficiency in producing the separating results desired, and yet will be of great simplicity and lightness, and its parts will be open or wide apart to admit of easy cleansing.

The invention consists in the improved centrifugal creamer and in the arrangements and combinations of parts, all substantially as will be hereinafter set forth and finally embraced in the clauses of the claim.

Figure 1:
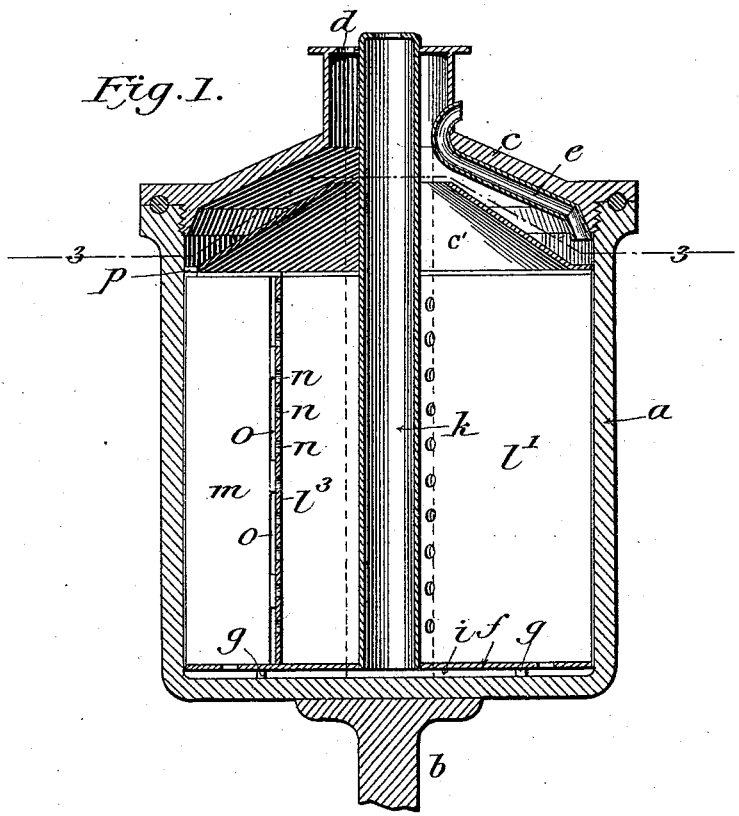
Figure 2:
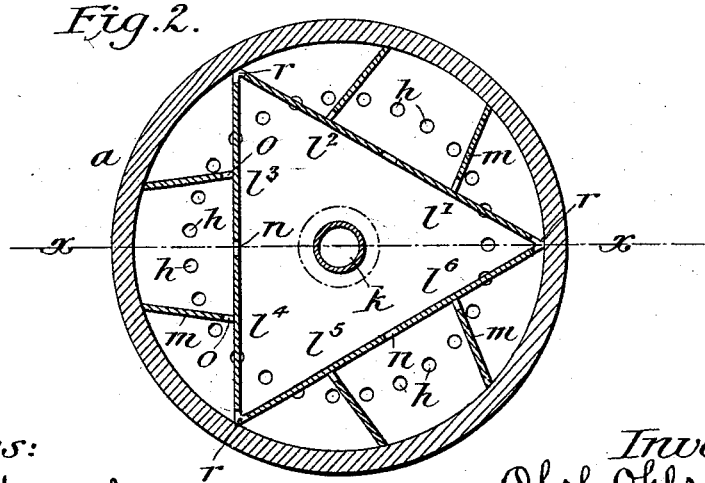
Figure 3:
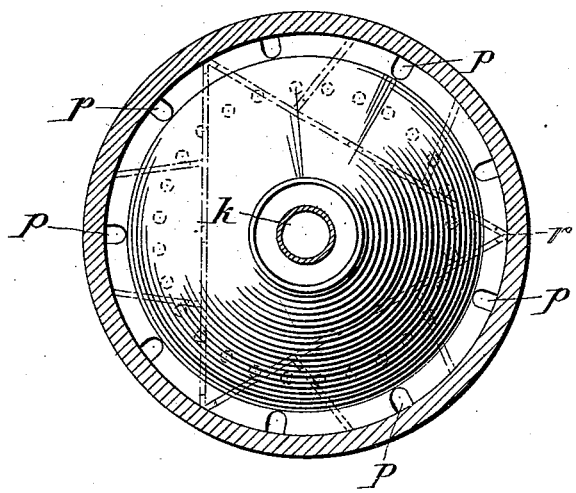
Figure 4:
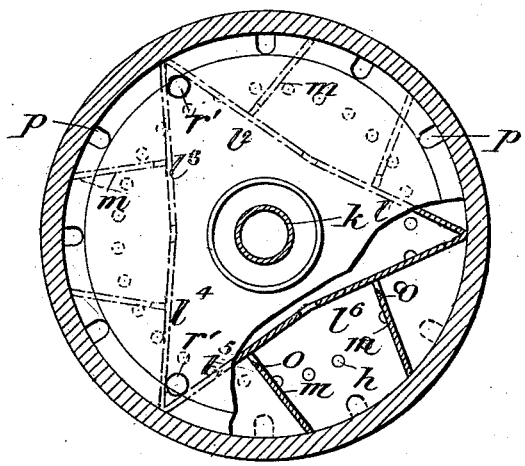

Referring to the accompanying drawings, in which like letters of reference indicate corresponding parts in all of the figures, Figure 1 is a central vertical section of a centrifugal creamer embodying my invention in its preferred form. Fig. 2 is a horizontal section of the same, the section of Fig. 1 being taken on the line $x$ of Fig. 2. Fig. 3 is a horizontal sectional view on the line 3—3 of Fig. 1, and Fig. 4 is a view similar to Fig. 3 but showing modified features.

In said drawings, $a$ indicates the creaming bowl seated upon a rotary shaft $b$, driven in any ordinary manner. $c$ is the cover for said bowl, which is centrally open to receive a supply of new milk, and is provided with a cream eduction opening, $d$, at one side of the center and a blue milk exit duct $e$, the latter being adapted to lead the blue milk from the peripheral part to a proper point of issuance from the bowl. Near the bottom of the bowl is arranged a horizontal plate $f$, which is held a little above the bottom of the bowl by suitable supports or stays, $g$. Said horizontal plate is provided with a series of perforations or openings somewhat near the outer parts of the chamber as indicated at $h, h, h$, through which the new milk enters from the passage $i$, formed by the plate $f$, to the main separating chamber. At its center, said horizontal plate is perforated and at said perforation a vertical tube $k$, is secured which leads the new milk from its supply reservoir to the bottom passage $i$.

On the upper side of the horizontal plate are arranged a single frame or series of vertical plates forming guiding portions $l'$, $l^2$; $l^3$, $l^4$; and $l^5$, $l^6$, being six in number. The portions $l'$ $l^2$ constitute one couple, $l^3$ $l^4$, another couple and $l^5$ $l^6$ another couple. These couples are mechanically made in one piece as herein shown and preferred but they functionally operate as separate guide plates to direct the partly separated cream inward toward the common openings $n$, nearest the center, said openings being preferably made small.

$m$ are supplementary guiding plates, shown as six in number. The number of these plates and the number of the portions $l'$, $l^2$, &c., can of course be varied. The guiding portions $l'$, $l^2$ &c., are arranged in the outer part of the liquid space of the bowl where the centrifugal action is most intense and the separating operation chiefly occurs and together they encircle the bowl center and so form an interior compartment in the liquid space of the bowl, and each member of a couple extends from a point near the periphery of the bowl to a point (at $n$) nearer the center of the bowl, thereby cutting the lines of centrifugal force obliquely and consequently acting as a guide plate for partly separated cream which it guides by its outer face from a point near the bowl periphery to the point where it approaches nearest to the bowl center. The couples, $l'$, $l^2$, &c., also have openings $n$ at their points that are nearest to the bowl center to permit an inflow of partly separated cream into the inner compartment, and preferably openings $r$ near the bowl periphery for the outflow of the separated blue milk, from the inner compartment, the former openings being preferably smaller in aggregate area of cross section than the latter. The openings $r$ permit the escape of blue milk from the inner compartment into the outer compartments of the liquid space whence the blue milk flows finally upward and out through the openings $p$ formed around the border of the top $c'$. The plates are arranged in couples. The two members of the couples $l'$, $l^2$, &c., meet at their points that are nearest to the bowl center and have at these points their openings $n$ in common whereby counter currents of partly separated cream are produced and caused to collide and are forced together through the common openings $n$ whereby partial coalescence of the fatty particles is brought about. As shown in Figs. 1, 2 and 3 each couple forms one straight plate meeting at $n$ and constituting together a chord of the bowl circle. The supplementary guiding plates $m$ are arranged outside of the frame or ring of guiding plates or portions $l'$ $l^2$, &c., and extend from at or near the bowl periphery to a point along the length of said portions, the plates $m$ and portions $l'$, $l^2$, &c., together forming angles that are intersected by radii of the bowl, whereby converging and substantially equal currents of partly separated cream are produced. The plates $m$ also have openings $o$ at their points of junction with the plates $l$. By this construction the plates $m$ and the outer parts of the portions $l'$ $l^2$, &c., act as collectors of partly separated cream particles and as guides for the streams of partly separated cream, guiding two streams or currents into collision at the openings $o$. Through these common openings the pressure of the incoming full milk or blue milk behind forces the cream current, whence it is guided by the continuation of the portions or couples $l'$ $l^2$, &c., toward the openings $n$ where the two couples that join at that point guide two opposing currents of partly separated cream into collision and into a forced passage through the common openings $n$. Thus continuous successive collisions of opposing or converging cream currents are brought about first at the openings $o$ and then at the openings $n$ by the combination and arrangement of guiding plates shown herein, full milk being continuously introduced into each and all of the compartments. These successive collisions tend to cause coalescence of the fatty cream particles which greatly furthers the ultimate separating action of the machine, the final separation in the inner compartment of the partly separated and coalesced cream that enters through the openings $n$ from the blue milk that is carried in with it being greatly facilitated. Said plates $m$ are preferably secured permanently to the plates $f$ and $l'$, $l^2$, &c., and are removable therewith from the bowl, and the spaces between the plates are capacious and allow an easy insertion of brushes or other cleansing means.

In Fig. 4 the openings $r$ are omitted so that blue milk within the frame cannot pass into the outer compartments. To permit the escape of blue milk, however, from the interior compartment of the bowl according to this arrangement openings $r'$ are provided in the border of the top and at points within the inner compartment and farthest from the center. The milk in the outer compartments will now escape through the openings $p$ as before but the blue milk within the inner compartment instead of passing into the outer compartments and out through openings $p$ will escape directly through their own openings $r'$.

In Fig. 4 the couples $l'$, $l^2$; $l^3$, $l^4$; $l^5$, $l^6$, are shown as converging inward instead of being in the same plane. The couples when thus arranged, however, operate in substantially the same way as when arranged in the same plane, guiding the cream particles always inward toward the center and causing them at the same time to collide and coalesce. With either arrangement of guide plates the openings $r$ could be employed or these openings could be omitted and the openings $r'$ used.

Although the couples $l'$, $l^2$; $l^3$, $l^4$, &c., are shown as made in one piece, of course they might be made in separate pieces and held in place by any suitable means such as the ordinary brace bars or plates or otherwise; or these couples could be soldered or otherwise fastened together so as to be held in place.

What I claim as new is—

1. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples each couple disposed in substantially the same plane and each couple having common openings at the points nearest to the center and supplementary outer guide plates cutting obliquely the lines of centrifugal force and arranged as described whereby currents of partly separated cream particles are formed and guided into successive collisions and progressive coalescence of the cream particles is attained, substantially as shown and described.

2. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples each couple disposed in substantially the same plane and each couple having common openings at the points nearest to the center and openings at the points farthest from the center, and supplementary outer guide plates cutting obliquely the lines of centrifugal force and arranged as described whereby currents of partly separated cream particles are formed and guided into successive collisions and progressive coalescence of the cream particles is attained, substantially as shown and described.

3. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples each couple converging inward, and each couple having common openings at the points nearest to the center and supplementary outer guide plates cutting obliquely the lines of centrifugal force and arranged as described whereby currents of partly separated cream particles are formed and guided into successive collisions and progressive coalescence of the cream particles is attained, substantially as shown and described.

4. In a centrifugal creaming machine, the combination with a bowl and means for rotating the same, of a single frame or series of guide plates arranged in the outer part (radially) of the liquid space of the bowl and encircling the bowl center and cutting obliquely the lines of centrifugal force and arranged to act as couples and each couple having common openings at the points nearest to the center and supplementary outer guide plates cutting obliquely the lines of centrifugal force and arranged as described whereby the liquid space of the bowl is divided into an inner compartment and outer compartments, blue milk outlet conduits for the outer compartments, separate blue milk outlet conduits for the inner compartment and suitable inlet conduits, whereby currents of partly separated cream particles are formed and guide into successive collisions and progressive coalescence of the cream particles is attained, substantially as shown and described.

5. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged in couples, each couple having common openings at the points nearest to the center and openings at the points farthest from the center, supplementary outer guide plates cutting obliquely the lines of centrifugal force and arranged as described and a milk distributing base plate having openings for full milk arranged on both sides of each guide plate and of each supplementary guide plate, substantially as shown and described.

6. In a centrifugal creamer, the combination with the rotary bowl, of a connected frame comprising the perforated horizontal plate $f$, the vertical guide plates, arranged in couples and the couples arranged in chords of the rotary bowl, and the plates $m$, disposed at angles to said vertical guide plates, the said guide plates and plates $f$ and $m$ being rigidly secured together from said bowl, and a feeding tube adapted to lead the milk below said perforated horizontal plate, substantially as set forth.

OLOF OHLSSON.

Witnesses:
NICHOLAS M. GOODLETT, Jr.,
WM. H. DE LACY.